United States Patent [19]

Honda et al.

[11] Patent Number: 4,483,009
[45] Date of Patent: Nov. 13, 1984

[54] TRANVERSAL EQUALIZER

[75] Inventors: Shunsuke Honda, Yokohama; Hideo Suzuki, Kawasaki; Haruki Yahata, Fujisawa, all of Japan

[73] Assignee: Tokyo Shibaura Denki Kabushiki Kaisha, Kawasaki, Japan

[21] Appl. No.: 305,227

[22] Filed: Sep. 24, 1981

[30] Foreign Application Priority Data

Sep. 24, 1980 [JP] Japan .................................. 55-132631
Sep. 24, 1980 [JP] Japan .................................. 55-132632

[51] Int. Cl.³ ............................................. H04B 3/14
[52] U.S. Cl. ....................................... 375/14; 333/18; 364/724
[58] Field of Search ................. 375/11, 12, 13, 14, 375/99, 100, 101, 103; 333/18; 364/724, 824

[56] References Cited

U.S. PATENT DOCUMENTS

| | | | |
|---|---|---|---|
| 3,522,546 | 8/1970 | Jackson et al. | 328/167 |
| 3,633,105 | 4/1972 | Lender et al. | 338/18 |
| 3,890,572 | 6/1975 | Desblanche | 333/18 |
| 3,914,691 | 10/1975 | Meadors, Jr. | 375/13 |
| 3,943,448 | 3/1976 | Motley et al. | 375/14 |
| 3,962,637 | 6/1976 | Motley et al. | 375/14 |
| 3,980,873 | 9/1976 | Mattel | 375/103 |
| 4,061,978 | 12/1977 | Motley et al. | 375/99 |
| 4,247,940 | 1/1981 | Muller et al. | 375/14 |
| 4,253,184 | 2/1981 | Gitlin et al. | 375/14 |
| 4,309,770 | 1/1982 | Godard | 375/14 |

FOREIGN PATENT DOCUMENTS 2724561 7/1978 Fed. Rep. of Germany .

OTHER PUBLICATIONS

IEEE Transactions on Communications, vol. Com-21, No. 9, Sep., 1973, New York, pp. 1046–1052 by Qureshi "Adjustment of the Position of the Reference Tap of an Adaptive Equalizer".

Primary Examiner—Robert L. Griffin
Assistant Examiner—Stephen Chin
Attorney, Agent, or Firm—Oblon, Fisher, Spivak, McClelland & Maier

[57] ABSTRACT

A transversal equalizer has a transversal filter which performs a convolution of an unequalized signal and a tap weight. In the automatic equalization mode, the tap weight is updated according to the result of a correlation of the unequalized signal and an error signal, and the updated tap weight is applied to the transversal filter. In the fixed equalization mode, a fixed tap weight stored in a memory is applied to the transversal filter.

7 Claims, 5 Drawing Figures

Figure 1:
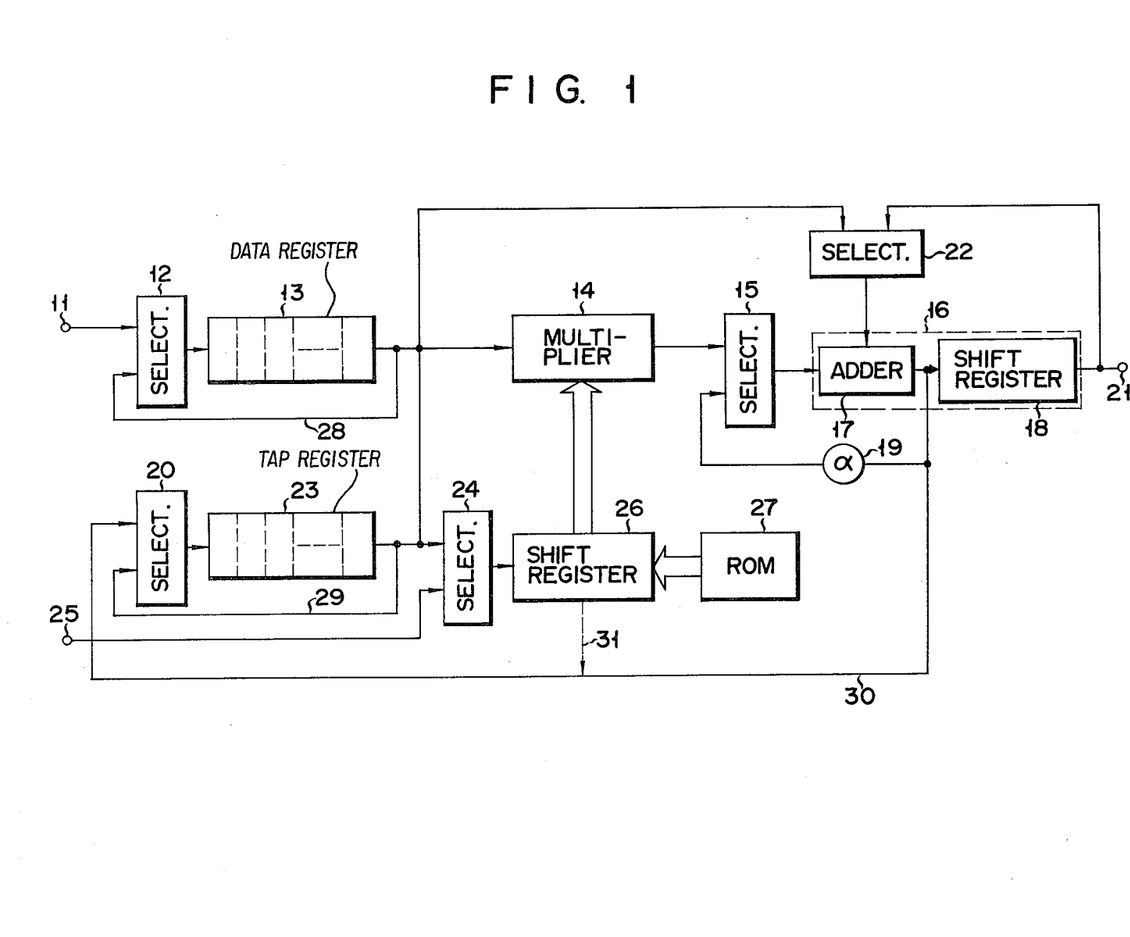
FIG. 1 is a block diagram showing a transversal equalizer according to an embodiment of the present invention.

FIG. 5 under control of the selector 15. This subtraction is performed in the adder 17. A new tap weight is stored in the tap register 23 through the shift register 18 and the selector 20. Thus, during the subinterval T2, the operation indicated by equation (2) below is performed:

$$c_j(\text{new}) = c_j(\text{old}) - \alpha \cdot e_i \cdot x_{i-j} \quad (2)$$

TRANVERSAL EQUALIZER

BACKGROUND OF THE INVENTION

The present invention relates to an equalizer and, more particularly, to a transversal equalizer using a transversal filter.

In high speed data transmission, equalization must be performed to compensate for intersymbol interference occuring in a telephone line. For accomplishing this equalization, the International Telegraph and Telephone Consultative Committee (CCITT) recommends the use of an automatic equalizer for 4,800 bps (bit per second) modem and a fixed equalizer for a 2,400 bps modem. Conventionally, the automatic equalizer and the fixed equalizer are separately used according to the two modems adopted, resulting in inconvenience.

SUMMARY OF THE INVENTION

It is an object of the present invention to provide an equalizer which has both functions of automatic equalization and fixed equalization.

In order to achieve this object, there is provided according to the present invention, a transversal equalizer which uses a transversal filter so that the automatic equalization mode and the fixed equalization mode may be freely selected by automatically correcting a tap weight supplied to the transversal filter or by supplying a fixed tap weight.

DETAILED DESCRIPTION OF THE PREFERRED EMBODIMENTS

Referring to FIG. 1, an input terminal 11 is connected to one input end of a selector 12, the output terminal of which is connected to the input terminal of a data register 13 for storing unequalized signals. The output terminal of the data register 13 is connected to the other input terminal of the selector 12 as well as to one input terminal of a multiplier 14. The output terminal of the multiplier 14 is connected to one input terminal of a selector 15, the output terminal of which is connected to the input terminal of an adder 17 of an accumulator 16. The output terminal of the adder 17 is connected to the input terminal of a shift register 18, the input terminal of a scaler 19, and one input terminal of a selector 20. The output terminal of the scaler 19 is connected to the other input terminal of the selector 15. The output terminal of the shift register 18 is connected to an output terminal 21 as well as to one input terminal of a selector 22. The data register 13, the multiplier 14 and the accumulator 16 constitute a transversal filter.

The output terminal of the selector 20 is connected to the input terminal of a tap register 23 for storing tap weights. The output terminal of the tap register 23 is connected to the other input terminal of the selector 20, one input terminal of a selector 24, and to the other input terminal of the selector 22. An error signal input terminal 25 is connected to the other input terminal of a selector 24, the output terminal of which is connected to the serial input terminal of a parallel-in/parallel-out shift register 26. Parallel output terminals of the shift register 26 are connected to parallel input terminals of the multiplier 14. A ROM 27 is also connected to the parallel input terminals of the shift register 26. A plurality of sets of tap weights are stored in this ROM 27.

The operation of a transversal equalizer of the construction as described above in the automatic equalization mode will first be described. In this mode, a convolution integration is performed during the subinterval T1 of one symbol interval or one sampling interval T, and a correlation and tap updating are performed during the subinterval T2. In the subinterval T1, an unequalized signal xi (e.g., a signal obtained by demodulation of an amplitude-modulated signal) is input to the data register 13 through the input terminal 11 and the selector 12 and is sequentially shifted in the data register 13. The outputs of the data register 13, i.e., the unequalized signals, are sequentially applied to the multiplier 14. Simultaneously, tap weight ($c_j$) signals in the tap register 23 are sequentially shifted and are sequentially supplied to the shift register 26 through the selector 24. The tap weight signals are converted into parallel data by the shift register 26 to be applied to the multiplier 14. The multiplier 14 calculates $c_j \cdot x_{i-j}$ (where $j = 1, 2, 3, \ldots N$). The signal result obtained from the multiplier 14 is applied to the accumulator 16 through the selector 15. The accumulator 16 accumulates the signal results to output an equalized output $y_i$. The accumulator 16 thus performs the operation of equation (1) below:

$$y_i = \sum_{j=1}^{N} c_j \cdot x_{i-j} \quad (1)$$

where N is the number of taps. With reference to this equation, the output signal ($x_{i-j}$) from the data register 13 is recirculated to the data register 13 through a line 28 and the selector 12. Similarly, the output signal $c_j$ from the tap register 23 is recirculated to the register 23 through a line 29 and the selector 20. During the subinterval T2, the multiplier 14 multiplies the output signal ($x_{i-j}$) from the data register 13 by an error signal $e_i$ applied from the error signal input terminal 25. The error signal $e_i$ is, for this purpose, applied to the multiplier 14 through the selector 24 and the shift register 26. The error signal $e_i$ is a signal obtained by subtracting a reference signal $a_i$ from the equalized output $y_i$ from the terminal 21. The output signal $e_i \cdot x_{i-j}$ from the multiplier 14 is applied to the scaler 19 through the selector 15 and the adder 16. The scaler 19 multiplies the output signal $e_i \cdot x_{i-j}$ by a constant step size $\alpha$. The output signal $\alpha \cdot e_i \cdot x_{i-j}$ from the scaler 19 is applied to the adder 16 through the selector 15 and is subtracted from the tap weight $c_j$ which is applied to the adder 17 from the tap register 23 through the selector 22. Thus, the tap weight is updated and a jth tap weight is obtained as follows:

$$c_j^{(\nu)} = c_j^{(\nu-1)} - \alpha \cdot e_i \cdot x_{i-j} \qquad (2)$$

This calculation is performed for each of N tap weights. In the next symbol interval a new unequalized input $x_{i+1}$ is supplied to the data register 13 through the selector 12. Then, the same operations as mentioned above is performed. In the following symbol intervals, new unequalized inputs are supplied to the data register 13 and the same operation is repeated, whereby the tap weight gradually converges to an optimum value. As a result, the channel equalization is accomplished.

Now it will be described how the equalizer of FIG. 1 operates when it is set to fixed equalization mode. In this case, several sets of impulse responses representing the inverse amplitude characteristics of a subscriber cable and several sets of impulse responses representing the inverse group-delay characteristics of the telephone channels are supplied to the ROM 27, whereby one impulse response is selected for each telephone line connected to the equalizer. In the subinterval T1, the unequalized input $x_{i-j}$ from the data register 13 is applied to the multiplier 14 together with a tap weight C for the amplitude characteristics, which is read out from the ROM 27. Both these signals $x_{i-j}$ and C are used in the convolution to thereby equalize the amplitude distortion. The convolution result is applied to the register 23 through the selector 22, the adder 17, a line 30, and the selector 20. In the subinterval T2, the signal, the amplitude distortion of which is reduced, from the register 23 is applied to the multiplier 14 together with the tap weight for the delay characteristics, which is read out from the ROM 27 and applied through the shift register 26, to convolve the signal having the reduced amplitude distortion with the tap weight. The signal of the reduced amplitude distortion is processed to reduce its group delay distortion. In this manner, an equalized signal is obtained from the output terminal 21.

As has been described above, in both the automatic equalization modes and the fixed equalization, the transversal filter constituted by the data register 13, the multiplier 14 and the accumulator 16 is used. In the fixed equalization mode, by selecting each set of tap weights to be read out from the ROM 27, equalization is carried out correspondingly to the connected subscriber cable length and number of links.

Figure 2:
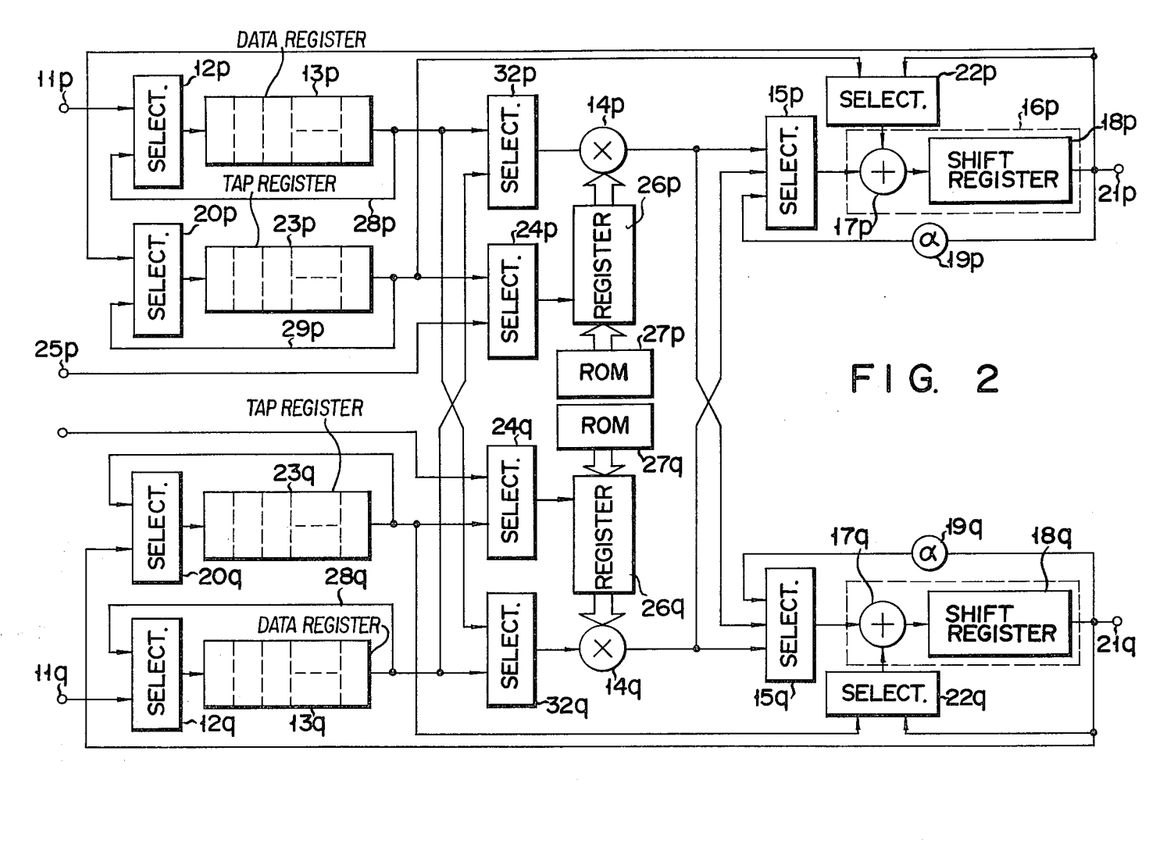
FIG. 2 is a block diagram showing a transversal equalizer which is capable of equalizing complex signals, according to another embodiment of the present invention.

FIG. 2 shows the equalizer device for equalizing complex signals such as PSK signals. This has an equalizer including a transversal filter for equalizing the in-phase components and another equalizer including a transversal filter for equalizing the quadrature components. The complex transversal equalizers are basically the same in construction as the embodiment shown in FIG. 1, so that the description thereof will be omitted. However, the parts of the equalizer for the in-phase components are denoted by the same reference numerals with p added, and the parts of the equalizer for the quadrature components are denoted by the same reference numerals with q added.

The mode of operation of the embodiment shown in FIG. 2 is basically the same as that of the embodiment shown in FIG. 1. However, the calculation becomes complicated since complex components are involved. Describing the mode of operation of this embodiment, in the subinterval T1, the convolution is performed. In this case a multiplier 14p performs $cp_j \times xp_{i-j}$
$cp_j \times xq_{i-j}$ A multiplier 14q performs $cq_j \times xp_{i-j}$
$cq_j \times xq_{i-j}$ where $xp_i$ are the in-phase components of the unequalized input, $xq_i$ are the quadrature components of the unequalized input, $cp_j$ are the in-phase components of the tap weight, $cq_j$ are the quadrature components of the tap weight, and $j = 1, 2, \ldots N$.

For performing the calculations according to the above relations, the signal is selected by selectors 24p, 24q, 32p and 32q. The output signals of the multipliers 14p and 14q are input to selectors 15p and 15q whereby the in-phase components and the quadrature components are selected which are applied to accumulators 16p are 16q, respectively. The accumulators 16p and 16q output the in-phase components $yp_i$ and the quadrature components $yq_i$ of the equalized signal. These components $yp_i$ and $yq_i$ may be represented by the following equation:

$$yp_i = \sum_{j=1}^{N} (cp_j \cdot xp_{i-j} - cq_i \cdot xq_{i-j})$$

$$yq_i = \sum_{j=1}^{N} (cq_i \cdot xp_{i-j} + cp_i \cdot xq_{i-j})$$

The correlation calculation and the tap weight updating are performed during the subinterval T2. In this case, the in-phase components $xp_i$ and the quadrature components $xq_i$ of the unequalized signals, and the in-phase components $ep_i$ and the unequalized components $eq_i$ of the error signal, are calculated. As a result of this calculation, the in-phase components $zp_{i-j}$ and the unequalized components $zq_{i-j}$ of the output signals are obtained by the following equations:

$zp_{i-j} = ep_i \cdot xp_{i-j} + eq_i \cdot xq_{i-j}$ $zq_{i-j} = eq_i \cdot xp_{i-j} - ep_i \cdot xq_{i-j}$ These output signal components $zp_{i-j}$ and $zq_{i-j}$ are input to scalers 19p and 19q, respectively, to be multiplied by the constant step size $\alpha$. The outputs from the scalers 19p and 19q, that is, $\alpha \cdot zp_{i-j}$ and $\alpha \cdot zq_{i-j}$, are applied to adders 17p and 17q through the selectors 15p and 15q, respectively, to perform calculations for updating of the tap weights $cp_j$ and $cq_j$. Thus, the calculations $cp_j^{(\nu)} = cp_j^{(\nu-1)} - \alpha \cdot zp_{i-j}$ $cq_j^{(\nu)} = cq_j^{(\nu-1)} - \alpha \cdot zq_{i-j}$ are performed for the N number of tap weights. The updated tap weights $cp_j$ and $cq_j$ are applied to registers 23p and 23q to update the tap weights of the tap registers 23p and 23q.

The above operation is performed in the automatic equalization mode. In the fixed equalization mode, the convolution is performed based on the fixed tap weights, selectively read out from ROMs 27p and 27q. In this case, the amplitude equalization is performed during the subinterval T1 and the group delay equalization is performed in the subinterval T2, as in the case of the embodiment shown in FIG. 1.

Another embodiment of the present invention will now be described with reference to FIG. 3. According to this embodiment, an unequalized signal input terminal 41 is connected to one input terminal of a selector 42, the output terminal of which is connected to the input terminal of a data register 43. The output terminal of the data register 43 is connected to the other input terminal of the selector 42 as well as to a first input terminal of a selector 44. The output terminal of a selector 45 is connected to the input terminal of a first tap register 46. The output terminal of the first tap register 46 is connected to the first input terminal of the selector 45, the second input terminal of the selector 44, and the first input terminal of a selector 47. The output terminal of a selector 48 is connected to the input terminal of a second tap register 49, the output terminal of which is connected to the first input terminal of the selector 48, the third input terminal of the selector 44, the second input terminal of the selector 47, and the first input terminal of a selector 50. The second input terminal of the selector 50 is connected to an error signal input terminal 51. The output terminals of the selectors 44 and 50 are connected to the input terminals of a multiplier 52 and a shift register 53, respectively. A parallel output terminals of the shift register 53 are connected to parallel input terminals of the multiplier 52. A ROM 54 storing fixed tap weights is connected to the parallel input terminals of the shift register 53. The output terminal of the multiplier 52 is connected to the first input terminal of a selector 55, the output terminal of which is connected to one input terminal of an adder 57 of an accumulator 56. The other input terminal of the adder 57 is connected to the output terminal of the selector 47. The output terminal of the adder 57 is connected to the second input terminals of selectors 45 and 48, a shift register 58, and a scaler 59. The output terminal of the shift register 58 is connected to a third input terminal of the selector 47 as well as to a first input terminal of a selector 60. A second input terminal of the selector 60 is connected to the unequalized signal input terminal 41. The output terminal of the selector 60 is connected to the input terminal of a buffer 61. The output terminal of the buffer 61 is connected to an equalized signal output terminal 62 as well as to third input terminals of the selectors 45 and 48.

The mode of operation of the transversal equalizer shown in FIG. 3 will now be described. In this embodiment, the unequalized input $x_i$, the equalized output $y_i$, and the error signal $e_i$ consist of n bits/word, and the tap weight $c_j$ consists of 2n bits/word. Each tap weight $c_j$ is divided into a subordination tap weight $C_j$sub of n bits and a superordination tap weight $C_j$super of n bits. The subordination and superordination tap weights $C_j$sub and $C_j$super are stored in the first and second tap registers 46 and 49, respectively.

According to this embodiment, one symbol interval or one sampling interval T is divided into 3N number of subintervals t. In the one third of the interval T, that is, in the initial subinterval T1=(0t to (N−1)t), the convolution is performed. During the remaining ⅔ interval, that is in the subinterval T2=(Nt to (2N−1)t) and the subinterval T3=(2Nt to (3N−1)t), the correlation and the correction of the tap weight updating are performed. In the subinterval T1, when the unequalized input $x_i$ (n bits) is selected by the selector 42 and is applied to the data register 43, the signal $x_i$ is sequentially shifted within the data register 43. The output signal $x_{i-j}$ from the data register 43 is selected by the selector 44 and is applied as a serial signal to the multiplier 52. The superordination tap weight $C_j$super is sequentially shifted within the second tap register 49 and is also applied to the multiplier 52 as the parallel signal through the selector 50 and the shift register 53. In this manner, the superordination tap weight $C_j$super and the unequalized input $x_{i-j}$ are subjected to the convolution. This convolution is performed N times (where N is the number of the tap weights). The outputs of the shift registers 43, 46 and 49 are recirculated for performing the correlation and the tap weight updating during the periods T2 and T3. The multiplication product: $C_j$super·$x_{i-j}$ obtained from the multiplier 52 is selected by the selector 55 to be applied to the accumulator 56. The accumulator 56 adds the multiplication product: $C_j$super·$x_{i-j}$ according to the following equation to output an addition signal $y_{il}$:

$$Y_{il} = \sum_{j=1}^{N} C_j\text{super} \cdot x_{i-j}$$

The addition signal $y_{il}$ is shortened by being rounded to n bits and is produced as the equalized output $y_i$ through the selector 60 and the buffer 61.

One correction of the tap weight is performed during the subintervals T2 and T3, that is, the interval 2t i.e. 4nτ. During the first subinterval t, the correlation of the unequalized input $x_i$ and the error signal $e_i$ is performed. In the latter subinterval t, the tap weight updating is performed. The serial input terminal of the multiplier 52 receives the output signal $x_{i-j}$ from the data register 43 as in the subinterval T1, and the parallel input terminals receive the error signals $e_i$ (n bits) converted into parallel signals. The output $e_i·x_{i-j}$ of the multiplier 52 is input to the scaler 59 through the selector 55 and the adder 57 to be multiplied by the constant step size α. The output $\alpha·e_i·x_{i-j}$ (2 bits) from the scaler 59 is applied to the adder 57 through the selector 55 and is subtracted from the tap weights $C_j$sub and $C_j$super which are applied to the adder 57 through the selector 47 and lines 63 and 64 from the first and second tap registers 46 and 49, respectively, for synthesis. In this manner, the updated tap weight $C_j$ is obtained from the adder 57. The tap weight $C_j$ thus obtained is divided again and is applied to the tap registers 46 and 49 through a line 65. The tap weight updating is thus performed for N number of taps.

The mode of operation of the transversal equalizer of the present invention in the automatic equalization mode has been described. The mode of operation in the fixed equalization mode will now be described. In the fixed equalization mode, the convolution for automatic equalization in the subinterval T1 is also performed during the subintervals T2 and T3. However, the tap weight is selectively produced from the ROM 54. The ROM 54 stores, as the fixed tap weights, impulse responses $11_j$, $12_j$ and $13_j$ of the opposite characteristics to those of the links 1, 2 and 4 among the 0, 1, 2, ... 7 links. The equalization characteristics for the 0, 1, 2, ... 7 links are set by a combination of control codes L1, L2 and L3 of 3 bits, for example, as shown in the table below:

|   | Control code | | | Equalization characteristics |
|---|---|---|---|---|
|   | L1 | L2 | L3 | |
| A | 0 | 0 | 0 | 0 link |
| B | 1 | 0 | 0 | 1 link |
| C | 0 | 1 | 0 | 2 link |
| D | 1 | 1 | 0 | 3 link |
| E | 0 | 0 | 1 | 4 link |
| F | 1 | 0 | 1 | 5 link |
| G | 0 | 1 | 1 | 6 link |

| Control code | | | Equalization |
|---|---|---|---|
| L1 | L2 | L3 | characteristics |
| H | 1 | 1 | 1 | 7 link |

The unequalized input $x_i$ is applied to the data register 43 through the selector 42 as well as to the buffer 61 through the selector 60. In the subinterval T1, the output $x_{i-j}$ from the data register 43 is applied to the serial input terminal of the multiplier 52 through the selector 44. The impulse response $ll_j$ of the opposite characteristics of 1 link, which is read out from the ROM 54 and converted into the parallel signals by the shift register 53, is also applied to the multiplier 52. The multiplier 52 performs the convolution on these two inputs. Thus, the calculation of the next equation is performed:

$$g1_i = \sum_{j=1}^{N} l1_j \cdot x_{i-j}$$

The calculation result $g1_i$ is applied to the buffer 61 if L1=1. If L1=0, the content of the buffer 61 is maintained to be the unequalized input $x_i$. In the subinterval T2, the output of the buffer 61 is applied to the first tap register 46 through a line 66 and the selector 45. If L1=1 and the signal $g1_i$ is applied to the first tap register 46, the signal $g1_i$ is selected by the selector 44 and is applied to the multiplier 52. The multiplier 52 performs the convolution of the signal $g1_i$ with the impulse response $l2_j$ of the opposite characteristics of the 2 link. Therefore, the calculation of the equation below is performed:

$$g2_i = \sum_{j=1}^{N} l2_j \cdot g1_{i-j}$$

The signal $g2_i$ obtained by this calculation becomes the signal which has been subjected to the equalization to 3 link, and this signal $g2_i$ is applied to the buffer 15 if L2=1. Subsequently, in the subinterval T3, the output of the buffer 15 is applied to the second tap register 49 through the line 66 and the selector 48. If L2=1 and the signal $g2_i$ is applied to the second tap register 49, the signal $g2_i$ is selected by the selector 44 and is applied to the serial input terminal of the multiplier 52. The multiplier 52 performs the convolution of the signal $g2_i$ with the impulse response $l3_i$ of the opposite characteristics of 4 link. Thus, the calculation of the following equation is performed:

$$y_i = \sum_{j=1}^{N} l3_j \cdot g2_{i-j}$$

If L3 of the control code is 1, the signal $y_i$ is applied to the buffer 15. In this manner, the unequalized input $x_i$ is equalized to a desired link by the combinations of the control codes L1, L2 and L3, and an output signal $y_i$ equalized to the desired link is obtained. For example, when the combination of the control codes L1, L2 and L3 is A as shown in the table, the unequalized input is not equalized; the unequalized input $x_i$ is produced as the output $y_i$ without any modification. When the combination is B, the output $y_i$ obtained by equalization to the 1 link is obtained by the convolution of the unequalized input $x_i$ and the impulse response of the opposite characteristics of the 1 link. Similarly, when the combinations are C to H, the outputs $y_i$ equalized for 2 to 7 links are obtained correspondingly.

As has been described, this invention can provide a transversal equalizer which can perform automatic and fixed equalizations, and wherein the same transversal filter is used for both automatic equalization and fixed equalization and a memory for storing fixed tap weights is supplied the fixed tap weight to the transversal filter in fixed equalization mode. In order to perform the fixed equalization, the memory for storing the tap weights for automatic equalization are divided into first and second tap weight memories. The equalizer of the present invention utilizes these memories for storing the unequalized signals for the automatic equalization mode. Thus, for the equalized signals may be obtained the convolution results from the memory originally designed for storing the unequalized signal and the memory for storing the fixed tap weights, as well as the convolution results of the unequalized signal stored in the first and second tap weight memories and the fixed tap weights stored in the fixed tap weight memory. For this reason, equalization characteristics which are greater in number than the kind of tap weights stored in the fixed tap weight memory may be obtained, so that the capacity of the fixed tap weight storing means may be significantly reduced.

In the embodiment described above, the initial value of the tap weights may be set in the following manner. A desired set of the fixed tap weights stored in the fixed tap weight memory is converted into serial data by the shift register and is set as the initial value of the tap weights in the tap memory for storing the tap weights for automatic equalization. In this manner, the speed of convergence of the tap weight may be increased.

Still another embodiment of the present inveniton will now be described with reference to FIG. 4. Since this embodiment is basically the same as the embodiment shown in FIG. 3, the same parts are denoted by the same reference numerals and the detailed description thereof is omitted. In this embodiment, the ROM 54 stores the impulse response $l1_j$, $l2_j$ and $l3_j$ of the inverse characteristics of 1, 2 and 4 links as well as the tap weights $l0_j$ of the center taps 1, 0 and the other taps 0,0. When all the control codes L1, L2 and L3 are 0, the tap weight $l0_j$ is selected. In the automatic equalization mode, the tap weights $C_j$ are stored in succession in the first and second tap registers 46 and 49. The output of the second tap register 49 is applied to the selector 45 through a line 67. The selector 45 receives four inputs. One input terminal of the selector 48 receives the output of the first tap register 46. The output of the second tap register 49 and the output of the accumulator 56 are applied to the selector 47. The mode of operation of this embodiment is basically the same as that shown in FIG. 3.

Figure 3:
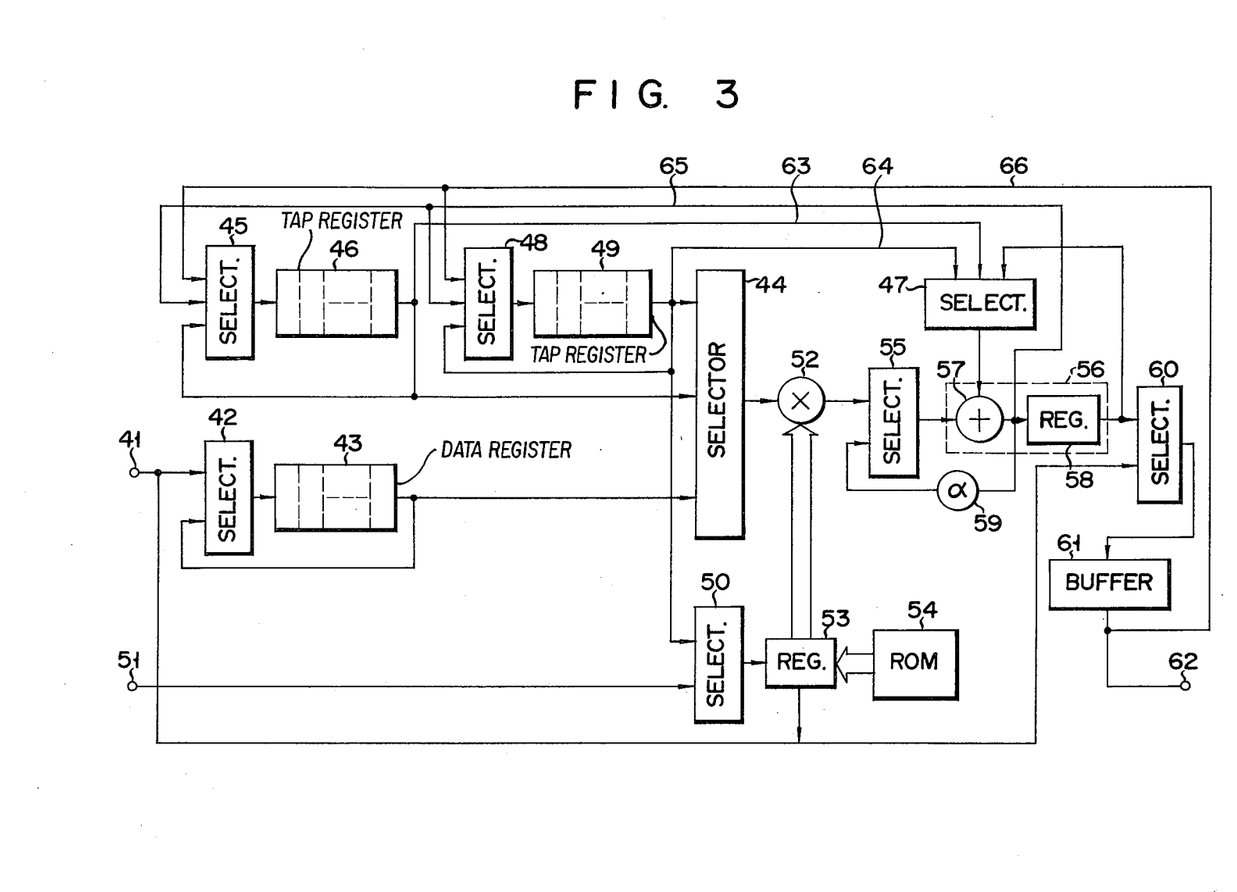
FIG. 3 is a block diagram of a transversal equalizer which utilizes arithmetic parts of transversal filters in time-division multiplex, according to still another embodiment of the present invention.
Figure 4:
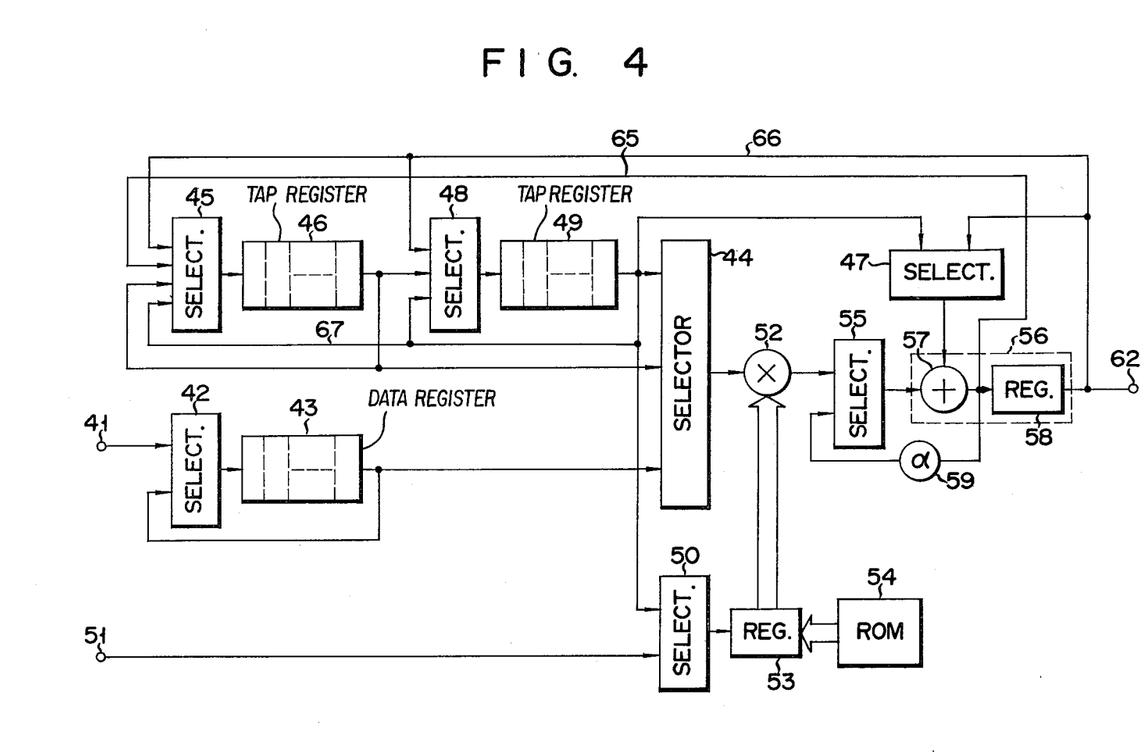
FIG. 4 is a block diagram showing a transversal equalizer using a different arithmetic method, according to still another embodiment of the present invention.

With reference to the embodiments shown in FIGS. 3 and 4, the fixed equalization for the group delay characteristics of the telephone channels, is described. However, the fixed equalization for the amplitude characteristics of the subscriber cable may be similarly performed. Furthermore, the number of convolutions during one symbol interval or one sampling interval T in the fixed equalization is not particularly limited to 3.

Figure 5:
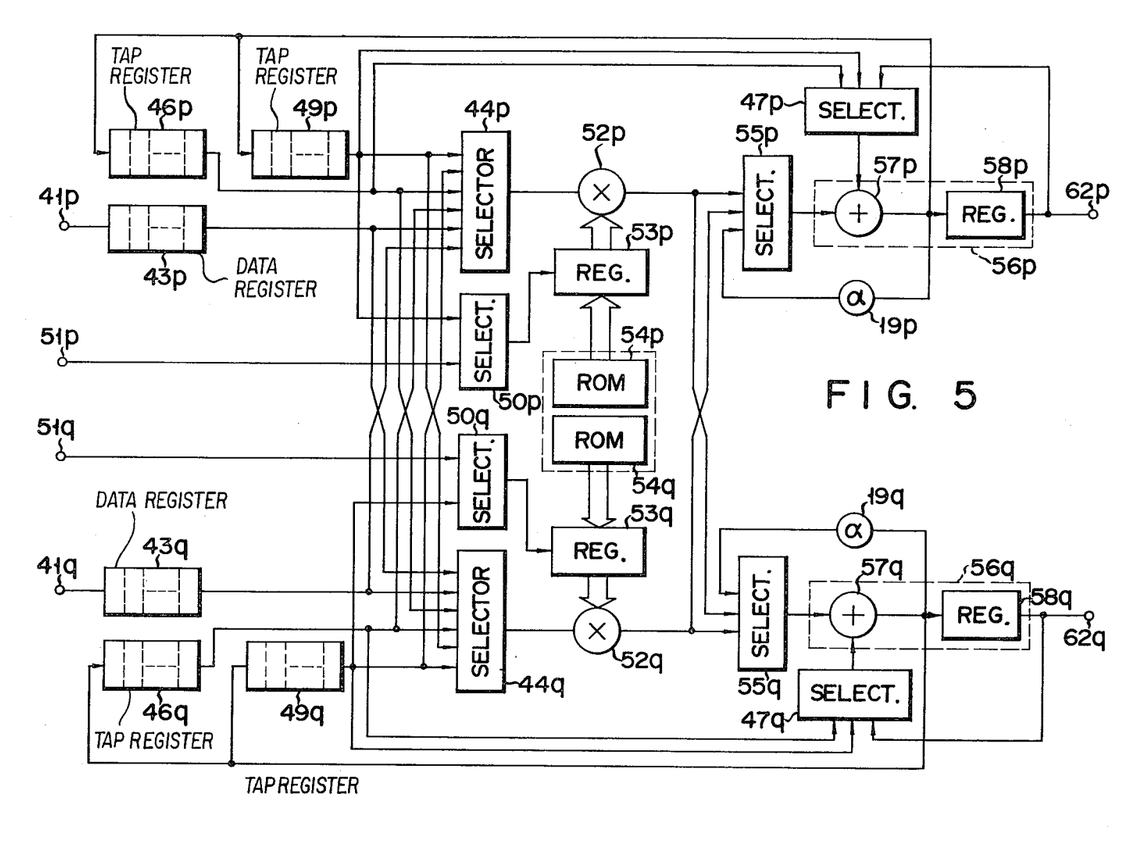
FIG. 5 is a block diagram showing a transversal equalizer which is capable of equalizing complex signals, according to still another embodiment of the present invention.

An embodiment of a transversal equalizer device for equalizing complex signals will now be described with reference to FIG. 5. This embodiment involves two equalizers equalizing the in-phase components and the quadrature components, respectively. Since the respective equalizers correspond to the equalizers shown in FIG. 4, the same reference numerals are used for the same parts and a detailed description of these parts will be omitted. The parts of the equalizer for the in-phase components are denoted by the same reference numerals with p added, and the parts of the equalizer for the quadrature components are denoted by the same reference numerals with q added. In FIG. 5, the selectors corresponding to the selectors 42, 45 and 48 shown in FIG. 5 are omitted. Selectors 44p and 44q receive 6 inputs, the outputs from data registers 43p and 43q, tap registers 46p and 46q, and tap registers 49p and 49q.

When the equalizer device is used as the automatic equalizer, a multiplier 52p for the in-phase components performs the calculations $Cp_j \cdot xp_{i \cdot j}$ and $Cp_j \cdot xq_{i \cdot j}$. When this equalizer device is used as the fixed equalizer, the multiplier 52p performs the calculations $lp_j \cdot xp_{i \cdot j}$ and $lp_j \cdot xq_{i \cdot j}$, where $xp_{i \cdot j}$ and $xq_{i \cdot j}$ are produced from the data registers 43p and 43q, $cp_j$ and $cq_j$ are produced from tap registers 49p and 49q, and $lp_j$ and $lq_j$ are produced from memories (ROMs) 54p and 54q storing the tap weights for the in-phase components and the tap weights for quadrature components. Similarly, in the automatic equalization mode, the multiplier 52q for the quadrature components performs the calculations of $ep_j \cdot xp_{i \cdot j}$ and $ep_j \cdot xq_{i \cdot j}$. In the fixed equalization mode, the multiplier 52q performs the calculations of $lq_j \cdot xp_{i \cdot j}$ and $lq_j \cdot xq_{i \cdot j}$. In this case, the multiplier 52p for the in-phase components produces outputs corresponding to $ep_j \cdot xp_{1 \cdot j}$ and $ep_j \cdot xq_{i \cdot j}$. Similarly, the multiplier 52q for the quadrature components produces outputs corresponding to $eq_{i \cdot j} \cdot xp_{i \cdot j}$ and $eq_{i \cdot j} \cdot xq_{i \cdot j}$. The outputs from the multipliers 52p and 52q are divided into the in-phase components and the quadrature components by selectors 55p and 55q and are applied to accumulators 56p and 56q, respectively, for performing the convolutions. The accumulator 56p for the in-phase components produces the in-phase component equalized output $yp_i$ represented by the following equations:

In the automatic equalization mode:

$$yp_i = \sum_{j=1}^{N} (cp_j \cdot xp_{i-j} - Cq_j \cdot xq_{i-j})$$

In the fixed equalization mode:

$$yp_i = \sum_{j=1}^{N} (lp_j \cdot xp_{i-j} - lq_j \cdot xq_j \cdot xq_{i-j})$$

In contrast with this, the accumulator 56q for the quadrature components produces the equalized guadrature output $yq_i$ represented by the following equation:

In the automatic equalization mode:

$$yq_i = \sum_{j=1}^{N} (Cq_i \cdot xp_{i-j} + Cp_j \cdot xq_{i-j})$$

In the fixed equalization mode:

$$yq_i = \sum_{j=1}^{N} (lq_i \cdot xp_{i-j} + lp_j \cdot xq_{i-j})$$

In the correlation calculation, the accumulators 56p and 56q produce outputs $zp_{i \cdot j}$ and $zq_{i \cdot j}$ expressed by the following equations:

$$zp_{i \cdot j} = ep_i \cdot xp_{i \cdot j} + eq_i \cdot xq_{i \cdot j}$$

$$zq_{i \cdot j} = eq_i \cdot xp_{i \cdot j} - ep_i \cdot xq_{i \cdot j}$$

For performing the correction of the tap weight, outputs $Cp_j^{(v-1)}$ and $Cq_j^{(v-1)}$ from the first and second tap registers 46p, 46q and 49p, 49q are selected by selectors 47p and 47q. The constant step size $\alpha$ is multiplied with the correlation output signals $zp_{i \cdot j}$ and $zq_{i \cdot j}$. Thus, the updated tap weights $Cp_j^{(v)}$ and $Cq_j^{(v)}$ are obtained by the following equations:

$$Cp_j^{(v)} = Cp_j^{(v-1)} - \alpha \cdot zp_{i \cdot j}$$

$$Cq_j^{(v)} = Cq_j^{(v-1)} - \alpha \cdot zq_{i \cdot j}$$

What we claim is:

1. A transversal equalizer comprising:
   a transversal filter which includes means for performing a convolution of an unequalized signal and a tap weight to equalize the unequalized signal;
   means in an automatic equalization mode for performing a correlation of the unequalized signal with an error signal and for updating the tap weight according to the correlation result;
   means for storing fixed tap weights; and
   means for, in a fixed equalization mode and the automatic equalization mode, selectively reading out a fixed tap weight from said storing means and for inputting the readout fixed tap weight to said transversal filter.

2. A transversal equalizer according to claim 1, wherein the tap weight is stored in first storing means at least in the automatic equalization mode; and said transversal filter comprises second storing means for storing the unequalized signal, a multiplier for multiplying the unequalized signal stored in said second storing means by the tap weight stored in said first storing means, and an accumulator for accumulating output signals from said multiplier.

3. A transversal equalizer according to claim 2, wherein said first stroing means comprises a shift register which selectively receives the recirculated tap weight and the updated tap weight, and said second storing means comprises a shift register which selectively receives the unequalized signal and the recirculated tap weight.

4. A transversal equalizer according to claim 1, wherein said transversal filter comprises a first transversal filter section for equalizing in-phase components of a complex signal and a second transversal filter section for equalizing quadrature components of the complex signal.

5. A transversal equalizer according to claim 1, wherein the tap weight is stored in a memory at least in the automatic equalization mode, and said memory comprises a first memory section for storing tap weights corresponding to the in-phase components and a second memory section for storing tap weights corresponding to the quadrature components.

6. A transversal equalizer comprising:
   a transversal filter which includes means for performing the convolution of an unequalized signal and a tap weight to equalize the unequalized signal;
   means for performing, in an automtic equalization mode, correlation of the unequalized signal with an error signal and for updating the tap weight according to the correlation result;

storing means comprising a first register which stores a subordination tap weight corresponding to the subordination of the tap weight and a second register which stores a superordination tap weight corresponding to the superordination of the tap weight in the automatic equalization mode, said first and second registers storing the unequalized signal in a fixed equalization mode;

means for storing fixed tap weights; and means for selectively reading out a fixed tap weight from said storing means and for inputting the read-out fixed tap weight to said transversal filter, in the fixed equalization mode and the automatic equalization mode, whereby said transversal filter performs the convolution of the fixed tap weight and the unequalized signal stored in said first and second registers.

7. A transversal equalizer according to claim 6, wherein said transversal filter comprises:

second storing means for storing the unequalized signal, a multiplier for multiplying the unequalized signal stored in said second storing means by the tap weight stored in said first storing means, and an accumulator for accumulating output signals from said multiplier.

* * * * *

UNITED STATES PATENT AND TRADEMARK OFFICE
CERTIFICATE OF CORRECTION

PATENT NO. : 4,483,009

DATED : November 13, 1984

INVENTOR(S) : Honda et al.

It is certified that error appears in the above-identified patent and that said Letters Patent is hereby corrected as shown below:

On the title page, Item [54] title:  should read

--TRANSVERSAL EQUALIZER--

Signed and Sealed this

Sixteenth Day of April 1985

[SEAL]

Attest:

DONALD J. QUIGG

Attesting Officer     Acting Commissioner of Patents and Trademarks